(12) United States Patent
Ruiz Villamil et al.

(10) Patent No.: US 8,714,003 B2
(45) Date of Patent: May 6, 2014

(54) WIND TUNNEL WITH A CLOSED SECTION FOR AEROACOUSTIC MEASUREMENTS WITH AN ANECHOIC COATING

(75) Inventors: Heidi Leni Ruiz Villamil, Madrid (ES); Jose Julian Alvarez Gonzalez, Madrid (ES); Pedro Cobo Parra, Madrid (ES)

(73) Assignee: Airbus Operations, S.L., Getafe, Madrid (ES)

( * ) Notice: Subject to any disclaimer, the term of this patent is extended or adjusted under 35 U.S.C. 154(b) by 115 days.

(21) Appl. No.: 13/266,139

(22) PCT Filed: Apr. 28, 2010

(86) PCT No.: PCT/ES2010/070268
§ 371 (c)(1),
(2), (4) Date: Mar. 14, 2012

(87) PCT Pub. No.: WO2010/125222
PCT Pub. Date: Nov. 4, 2010

(65) Prior Publication Data
US 2012/0167675 A1     Jul. 5, 2012

(30) Foreign Application Priority Data
Apr. 28, 2009  (ES) .................................. 200901102

(51) Int. Cl.
*G01M 9/00*    (2006.01)
(52) U.S. Cl.
USPC ............................................................ 73/147
(58) Field of Classification Search
USPC ........... 73/147; 701/47; 296/187.03; 180/312
See application file for complete search history.

(56) References Cited

U.S. PATENT DOCUMENTS 4,448,921 A * 5/1984 Yamaya et al. ............... 524/443
5,495,754 A * 3/1996 Starr et al. ...................... 73/147

FOREIGN PATENT DOCUMENTS

EP     1161360 B1 *  7/2002

OTHER PUBLICATIONS

Potential of microperforated panel absorber—Dah—you, Maa, Jul. 16, 1998, J. Acoust. Soc. Am,, 104, 2861-2866, pp. 1-5.*
International Search Report Issued Jul. 26, 2010 in PCT/ES10/070268 Filed Apr. 28, 2010.

* cited by examiner

*Primary Examiner* — Jessica Stultz
*Assistant Examiner* — Sheikh Maruf
(74) *Attorney, Agent, or Firm* — Oblon, Spivak, McClelland, Maier & Neustadt, L.L.P.

(57) ABSTRACT

A wind tunnel with a closed section for aeroacoustic measurements with an anechoic coating including: a) a first cavity having a thickness $D_1$ in a range of $20 \leq D_1 \leq 50$ mm filled with a fibrous material with a flow resistance R in a range of $10 \leq R \leq 50$ kRayl/m; b) a first microperforated panel having a thickness $t_1$ in a range of $0.25 \leq t_1 \leq 0.75$ mm and with a perforation percentage $p_1$ in a range of $15\% \leq p_1 \leq 30\%$; c) a second air cavity having a thickness $D_2$ in a range of $10 \leq D_2 \leq 30$ mm; d) a second microperforated panel having a thickness $t_2$ in a range of $0.25 \leq t_2 \leq 0.75$ mm and with a perforation percentage $p_2$ in a range of $15\% \leq p_2 \leq 30\%$. The perforations of the panels can be circular or longitudinal slot-shaped having a diameter d or width w in a range of $0.2 \leq d, w \leq 0.5$ mm.

6 Claims, 3 Drawing Sheets

WIND TUNNEL WITH A CLOSED SECTION FOR AEROACOUSTIC MEASUREMENTS WITH AN ANECHOIC COATING

FIELD OF THE INVENTION

The present invention relates to a wind tunnel with a closed section provided with an anechoic coating for taking aeroacoustic measurements and more particularly to a wind tunnel for conducting aerodynamic and acoustic tests of scale aircraft models.

BACKGROUND OF THE INVENTION

Wind tunnels are used to conduct aerodynamic and aeroacoustic tests of scale models of various types of vehicles and particularly of aircraft. Aerodynamic tests traditionally use a closed section configuration because it is a mature technique in which the air flow impinging on the mock-up is not really affected by the walls and because the associated corrections are very well known. However, the measurements aeroacoustic are usually performed in an open section because reverberations in the walls of the tunnel are thus avoided. This means that the aerodynamic and aeroacoustic tests are done separately, with the subsequent duplication of efforts and costs.

Even though various materials capable of absorbing sound are well known in the prior art, no specific proposal, however, providing a coating of a closed section of a wind tunnel with a high degree of acoustic absorption which allows easily taking the measurements which are required in aeroacoustic tests of, particularly, aircraft models, is known.

The commercial solutions for the absorption of sound using porous and fibrous materials are not applicable for said coating due to the fact that the air jet circulating inside the tunnel at a high speed would end up carrying off said materials, with the subsequent loss of the acoustic absorption properties.

In relation to microperforated panels (MMPs) which, in theory can be considered applicable to said coating, several proposals which have been used in several industrial sectors are known. The MPPs proposed by Maa (D. Y. Maa, (1997), "Potential of microperforated panel absorber" J. Acoust. Soc. Am., 104, 2861-2866) provide absorption of the sound by visco-thermal losses in sub-millimetric perforations made on a panel and therefore do not require the addition of fibrous materials. In order to tune the absorption in the frequency band of interest, it is necessary to have these MPPs in front of a rigid wall, leaving an air cavity having a certain thickness.

The use of MPPs for the absorption of the sound in various environments is well known in the art and has been the object of several patents.

U.S. Pat. No. 5,700,527 describes the use of microperforated glass as absorbent materials in the construction of buildings. They are simple glass MPPs having a thickness t in the range of $0.2 \leq t \leq 30$ mm, with circular perforations having a diameter d in the range of $0.1 \leq d \leq 2$ mm and air cavities having a thickness D in the range of $20 \leq D \leq 500$ mm.

ES 2 211 586 describes the use of MPPs for coatings in means of transportation, such as land vehicles, trains, ships and airplanes, with panels having a thickness t in the range of $0.2 \leq t \leq 5$ mm, perforations having a diameter d in the range of $0.05 \leq d \leq 2$ mm, and perforation percentages p in the range of $0.2 \leq p \leq 4\%$. The air cavity in this case can be filled with spongy material or wadding.

EP 1 382 031 describes the use of multilayer MPPs for absorbent coatings engine exhaust systems or in turbines. The metal have thicknesses of $t < 0.2$ mm, perforations having diameters of $d < 1$ mm, and perforation percentages of $p < 1\%$.

U.S. Pat. No. 6,675,551 describes low-cost thick MPPs for their application as constructive elements. The panels can be made of wood, synthetic material or laminated gypsum, and can be combined with other absorbent materials, such as foams, mineral wools or acoustic fabrics. The panels can have thicknesses t in the range of $6 \leq t \leq 30$ mm, with circular perforations having diameters $d \leq 2$ mm, and perforation percentages of $p \leq 4\%$.

U.S. Pat. No. 6,617,002 describes MPPs using polymeric films. Since these films have a rigidity of less than $10^7$ dynes/cm, with a thickness of $t < 0.38$ mm, the model includes its elastic properties. Another novelty of this patent is the use of conical perforations, with a major diameter of $d_1 < 0.5$ mm, and a minor diameter of $d_2 < 0.15$ mm.

As can be inferred from the foregoing, the known proposals are aimed at solving specific acoustic insulation problems very different from those of an anechoic coating of a wind tunnel.

However, it is desirable to have such coating and the present invention aims to solve this need.

SUMMARY OF THE INVENTION

An object of the present invention is to provide a coating for a closed section of a wind tunnel providing absorption of the sound in a frequency band from 500 Hz to 14 kHz which facilitates taking aeroacoustic measurements.

Another object of the present invention is to provide a coating for a closed section of a wind tunnel which allows conducting aeroacoustic tests on aircraft models.

These and other objects are achieved with an sound-absorbing coating comprising, from the wall of the tunnel, the following components: a) a first cavity filled with a fibrous material; b) a first microperforated panel (MPP); c) a second air cavity; d) a second microperforated panel (MPP), with the following features: the first cavity has a thickness $D_1$ comprised in the range of $20 \leq D_1 \leq 50$ mm and is filled with a fibrous or porous material having flow resistivity R comprised in the range of $10 \leq R \leq 50$ kRayl/m; the MPPs have thicknesses $t_{1,2}$ comprised in the range of $0.25 \leq t_{1,2} \leq 0.75$ mm and a perforation percentage $p_{1,2}$ comprised in the range of $15\% \leq p_{1,2} \leq 30\%$; the second air cavity has a thickness $D_2$ comprised in the range of $10 \leq D_2 \leq 30$ mm.

In a preferred embodiment, the perforations of the MPPs are circular-shaped with a diameter d comprised in the range of $0.2 \leq d \leq 0.5$ mm. Coatings for anechoic sections for wind tunnels with optimal absorption capacities are thus achieved.

In another preferred embodiment, the perforations of the MPPs are longitudinal slot-shaped perforations oriented in the direction of the wind flow in the tunnel with a width w comprised in the range of $0.2 \leq w \leq 0.5$ mm. Coatings for anechoic sections for wind tunnels with an optimal absorption capacity/cost ratio are thus achieved.

Other features and advantages of the present invention will be understood from the following detailed description of an illustrative embodiment of the object of the invention in relation to the attached figures.

DETAILED DESCRIPTION OF THE INVENTION

It is considered that a suitable anechoic coating of a closed section of a wind tunnel in order to be able to conduct aeroacoustic tests must be able to provide an average absorption in normal incidence of 90% in a frequency band from 500 Hz to 14 kHz (almost 5 octaves).

Figures 1A, 1B:
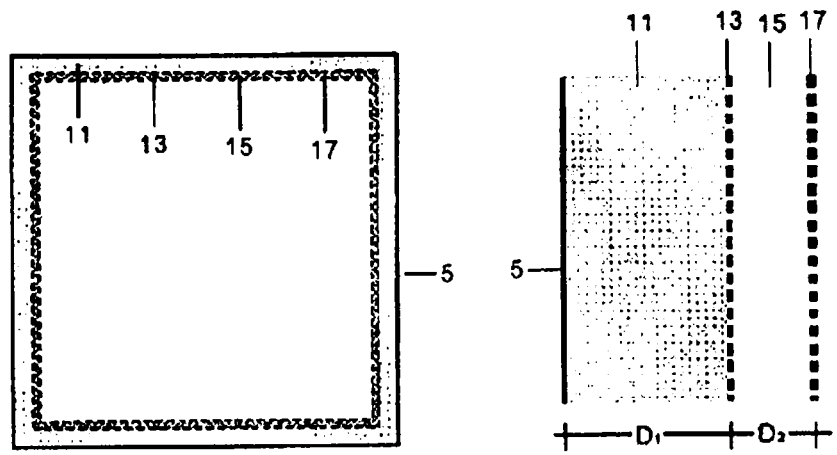
FIG. 1a is a cross-section schematic view of a wind tunnel with an anechoic coating according to the present invention and FIG. 1b is a zoomed-in cross-section view of the structure of this coating.

According to a preferred embodiment of the present invention, and following FIGS. 1a and 1b, a closed section of a wind tunnel can be observed, the inner wall 5 of which is provided with a coating formed by the following components:

- A first cavity 11 having a thickness $D_1$ comprised in the range of $20 \leq D_1 \leq 50$ mm filled with a fibrous or porous material of flow resistivity R comprised in the range of $10 \leq R \leq 50$ kRayl/m.
- A first MMP 13 with thickness $t_1$ comprised in the range of $0.25 \leq t_1 \leq 0.75$ mm and a perforation percentage $p_1$ comprised in the range of $15\% \leq p_1 \leq 30\%$.
- A second air cavity 15 having a thickness $D_2$ comprised in the range of $10 \leq D_2 \leq 30$ mm.
- A second MMP 17 having a thickness $t_2$ comprised in the range of $0.25 \leq t_2 \leq 0.75$ mm and a perforation percentage $p_2$ comprised in the range of $15\% \leq p_2 \leq 30\%$.

The suitability of the mentioned coating for complying with the demands of the wind tunnel has been validated using an absorption model dependent on the relevant parameters of its components obtained from the input impedance thereof, which depends on the acoustic impedance of the MPP and of the acoustic impedance of the porous material. For example, the impedance of the MPP can be known from Maa's equations (D. Y. Maa, 1997, "Potential of microperforated panel absorber" J. Acoust. Soc. Am., 104, 2861-2866), and the impedance of the porous layer can be obtained from the Allard and Champoux model (J. F. Allard and Y. Champoux, 1992, "New empirical equations for sound propagation in rigid frame fibrous materials", J. Acoust. Soc. Am., 91, 3346-3353).

Figure 3:
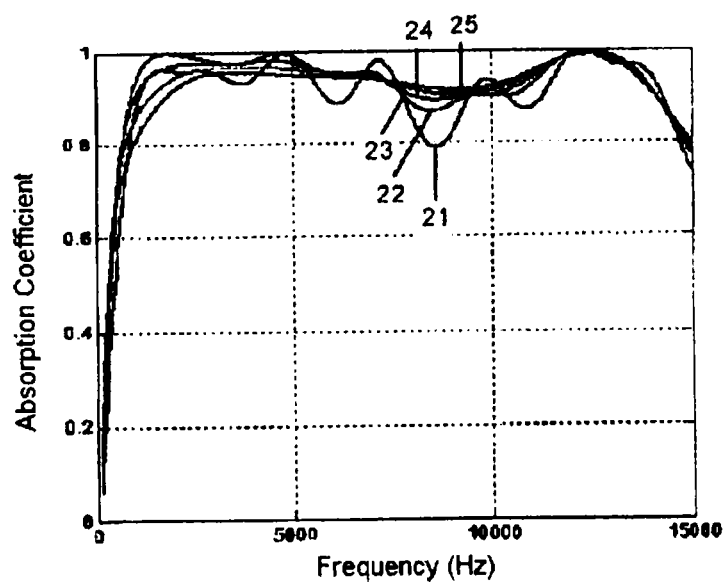
FIG. 3 shows absorption curves in normal incidence of the anechoic coating of a wind tunnel according to the present invention as a function of the flow resistivity of the fibrous material of the first cavity.

FIG. 3 shows the ratio between the absorption coefficient α of the coating and the value for the flow resistance R of the porous material of the cavity 11 for the remaining fixed parameters. The curves 21, 22, 23, 24, 25 are those corresponding, respectively, to the following values for R: 10000, 21000, 30000, 40000 and 50000. As can be seen, maximum absorption is obtained for a porous material with flow resistance of 20 kRayl/m. This is a typical value for the resistivity of rock wools, for example.

Figure 4:
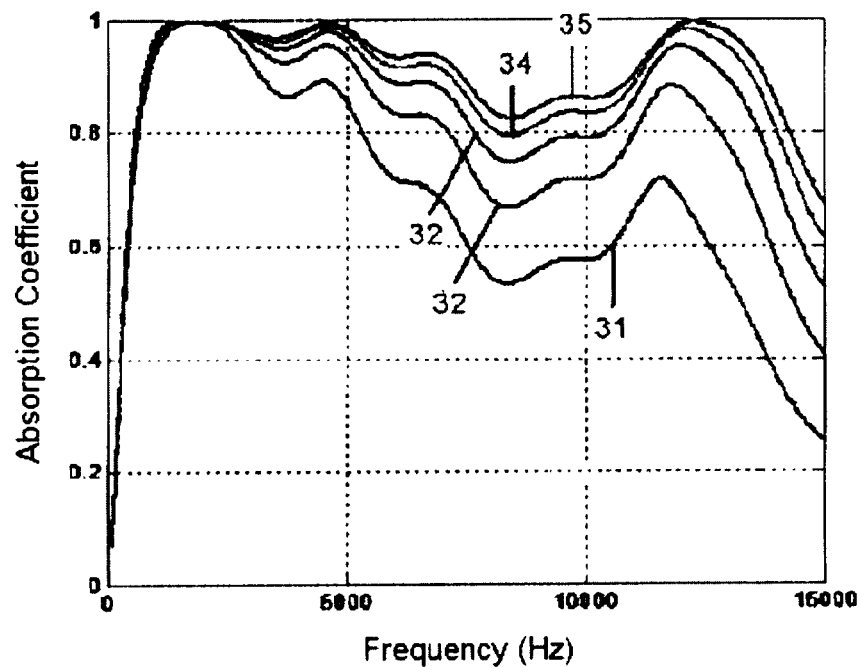
FIG. 4 shows absorption curves in normal incidence of the anechoic coating of a wind tunnel according to the present invention as a function of the perforation percentage of the second MPP.

FIG. 4 shows the ratio between the absorption coefficient α of the coating and the perforation percentage of the second MPP 17 for the remaining fixed parameters. The curves 31, 32, 33, 34, 35 are those corresponding, respectively, to the following values for perforation percentage: 10%, 15%, 20%, 25% and 30%. As can be seen, the greater the perforation percentage, the greater the absorption. The ratio between the absorption coefficient α of the coating and the perforation percentage of the first MPP 13 is similar.

Figure 5:
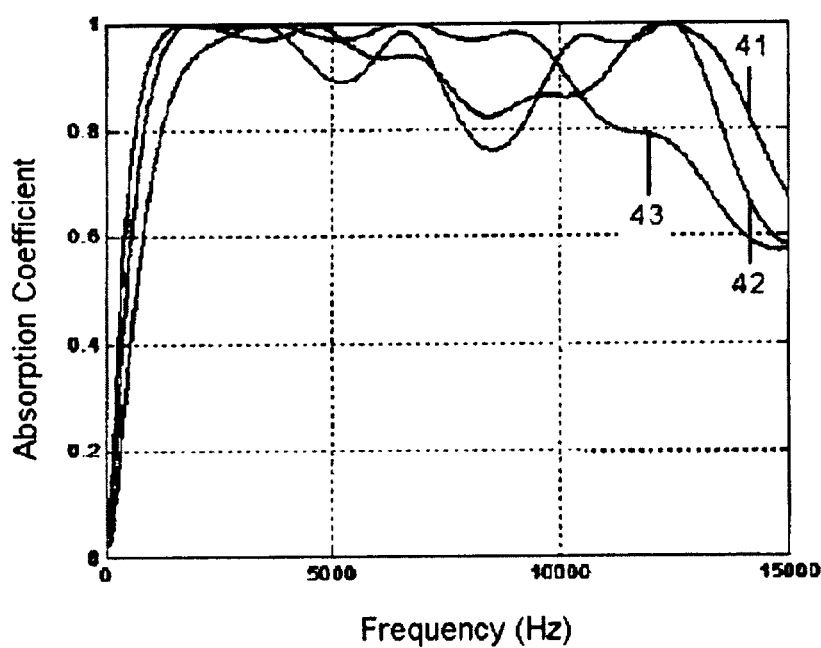
FIG. 5 shows the absorption curves in normal incidence of the anechoic coating of a wind tunnel according to the present invention for several combinations of the thicknesses of the first and the second cavity.

FIG. 5 shows the ratio between the absorption coefficient α of the coating and the thicknesses $D_1$ and $D_2$ of the two cavities 11, 15 for the remaining fixed parameters. The curves 41, 42, 43 are those corresponding, respectively, to the following pairs of values for $D_1$ and $D_2$: 5 cm, 1.9 cm; 3 cm, 2 cm; 4 cm, 1 cm. As can be seen, it is necessary to suitably combine both thicknesses $D_1$ and $D_2$ to obtain a high absorption curve.

The perforations of the first and second MPPs 13 and 17 can have different shapes, particularly circular and longitudinal slot shapes. In the first case, the diameter d of the perforations is comprised in the range of $0.2 \leq d \leq 0.5$ mm.

Figure 6:
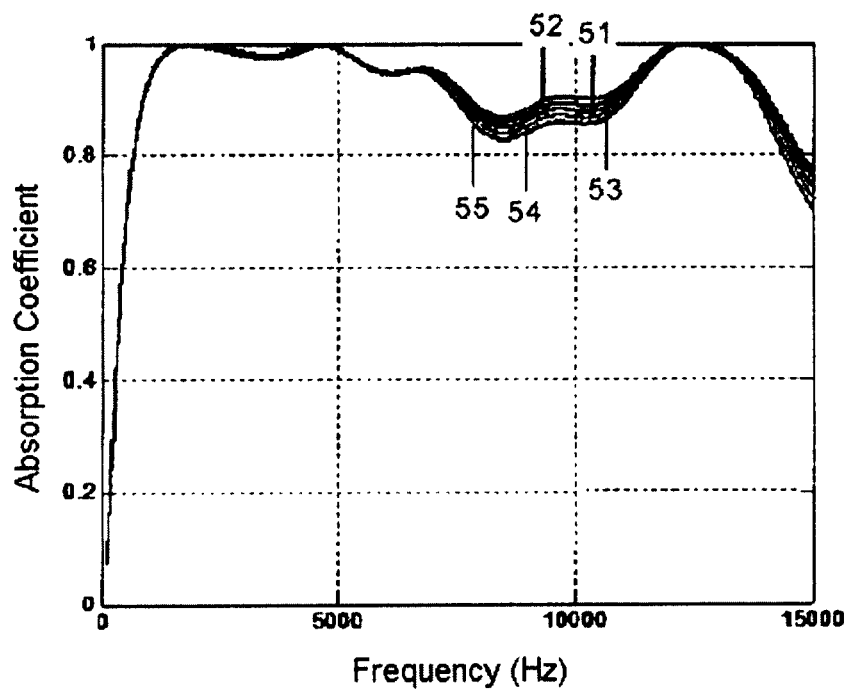
FIG. 6 shows absorption curves in normal incidence of the anechoic coating of a wind tunnel according to the present invention as a function of the diameter of the perforations of the first MPP.

FIG. 6 shows the ratio between the absorption coefficient α of the coating and the diameter of circular perforations having diameter d of the first MPP 13 for the remaining fixed parameters. The curves 51, 52, 53, 54 and 55 are those corresponding, respectively, to the following values for d: 0.3, 0.4, 0.5, 0.6 and 0.7. As can be seen, the smaller said diameter, the greater the absorption. The ratio between the absorption coefficient α of the coating and the diameter d of circular perforations of the second MPP 17 is similar.

Figure 2:
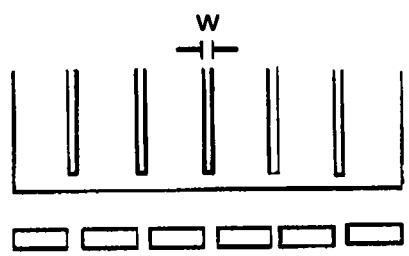
FIG. 2 is a schematic plan and cross-section view of an MMP with slot-shaped perforations.

It has been experimentally verified that an absorption effect similar to that of the circular perforations with longitudinal slots the width w of which (see FIG. 2) is equal or similar to the diameter of the circular perforations. The longitudinal direction of said slots must preferably coincide with the direction of the wind flow in the tunnel. The cost of making these slots is considerably less than the cost of making circular perforations.

Figure 7:
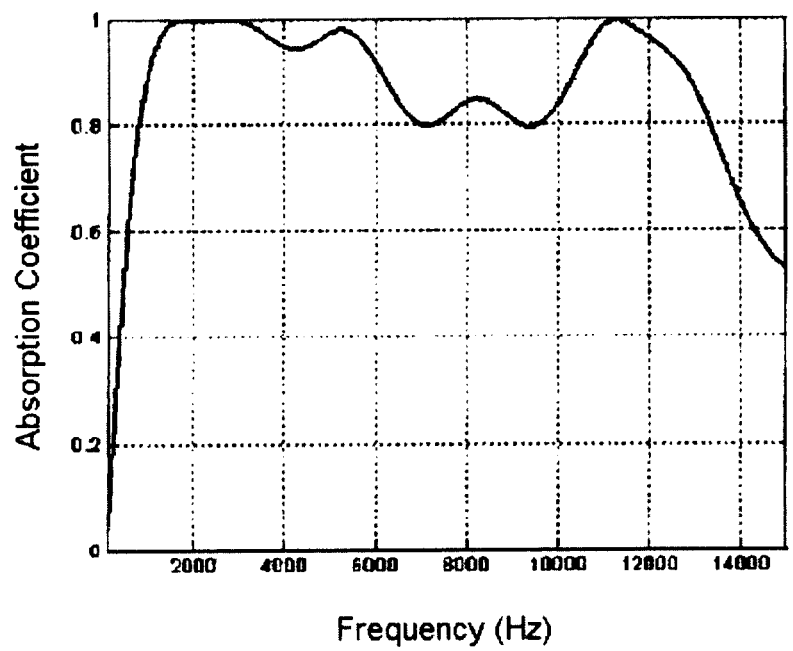
FIG. 7 shows an absorption curve in normal incidence of an anechoic coating of a wind tunnel according to a specific embodiment of the present invention.

A specific coating has been carried out for a section of 200 mm in length of a wind tunnel having a rectangular section of 200×200 mm with two metal MPPs 13 and 17, having parameters of $t_{1,2}=0.5$ mm, $p_{1,2}=23\%$ and longitudinal slot-shaped perforations having a width of w=0.23 mm made with a laser, a first cavity 11 having a thickness of $D_1=40$ mm, filled with a rock wool having flow resistivity of R=28 kRayl/m, and a second air cavity 15 having a thickness of $D_2=20$ mm, made with a honeycomb structure. FIG. 7 shows the absorption curve in normal incidence of this coating. The absorption coefficient in the frequency band between 500 Hz and 15 kHz is 0.88.

The modifications comprised within the scope defined by the following claims can be introduced in the preferred embodiments described above.

The invention claimed is:

1. A wind tunnel comprising:
a closed section for aeroacoustic measurements,
wherein inner walls of the closed section comprise a sound-absorbing coating which, from the inner walls, comprises:
a first cavity defined between the inner walls and a first microperforated panel, the first cavity having a thickness $D_1$ in a range of $20 \leq D_1 \leq 50$ mm filled with a fibrous material with a flow resistance R in a range of $10 \leq R \leq 50$ kRayl/m;

the first microperforated panel having a thickness $t_1$ in a range of $0.25 \leq t_1 \leq 0.75$ mm and with a perforation percentage $p_1$ in a range of $15 \leq p_1 \leq 30\%$;

a second cavity defined between the first microperforated panel and a second microperforated panel, the second cavity having a thickness $D_2$ in a range of $10 \leq D_2 \leq 30$ mm;

the second microperforated panel having a thickness $t_2$ in a range of $0.25 \leq t_2 \leq 0.75$ mm and with a perforation percentage $p_2$ in a range of $15\% \leq p_2 \leq 30\%$.

2. The wind tunnel according to claim 1, wherein the first and second microperforated panels have circular section perforations.

3. The wind tunnel according to claim 2, wherein the diameter d of the perforations is in a range of $0.2 \leq d \leq 0.5$ mm.

4. The wind tunnel according to claim 1, wherein the first and second microperforated panels have longitudinal slot-shaped perforations having a width w which is in a range of $0.2 \leq w \leq 0.5$ mm.

5. The wind tunnel according to claim 4, wherein the longitudinal slots are made in directions parallel to a direction of the wind flow in the tunnel.

6. The wind tunnel according to claim 1, wherein the first and second microperforated panels are metal panels and the filling material of the first cavity is rock wool.

* * * * *